No. 721,552. PATENTED FEB. 24, 1903.
W. R. EVANS.
ANIMAL POKE.
APPLICATION FILED NOV. 19, 1902.
NO MODEL.
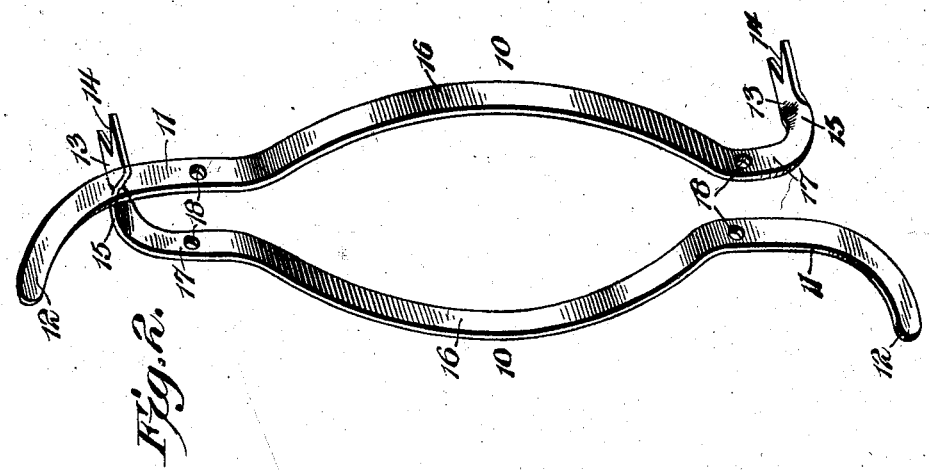
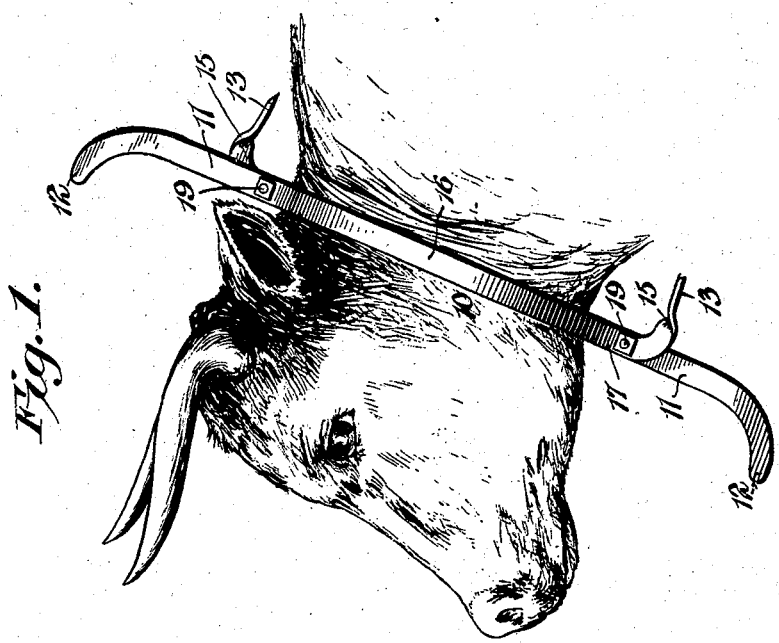
W. R. Evans, Inventor,
Witnesses

UNITED STATES PATENT OFFICE.

WILLIAM R. EVANS, OF EAGLEVILLE, MISSOURI.

ANIMAL-POKE.

SPECIFICATION forming part of Letters Patent No. 721,552, dated February 24, 1903.

Application filed November 19, 1902. Serial No. 132,042. (No model.)

*To all whom it may concern:*

Be it known that I, WILLIAM R. EVANS, a citizen of the United States, residing at Eagleville, in the county of Harrison and State of Missouri, have invented a new and useful Animal-Poke, of which the following is a specification.

This invention relates to that class of animal-pokes which are placed upon the animal's neck and are provided with stop-arms and prods respectively arranged to engage the fence and animal should the latter attempt to pass through the former.

The object of this invention is to provide an extremely simple article of this character that is made up of duplicate parts, being, therefore, easily and cheaply manufactured and having no small elements that are liable to be lost should the fastening means be broken.

The preferred form of construction is clearly shown in the accompanying drawings, wherein—

Figure 1 shows the improved poke in place upon an animal's neck. Fig. 2 is a perspective view showing the members separated.

Similar numerals of reference designate corresponding parts in both figures of the drawings.

In the embodiment shown two members 10 are employed, which are duplicates and are preferably formed of flat-sided metallic bars. These members each comprise a stop-arm 11, located at one end and having a forwardly-projecting terminal hook 12. A rearwardly-projecting prod 13 is arranged at the other end of the member and is preferably bifurcated, as shown at 14, to provide sharpened points, this prod being arranged at substantially right angles to the member and having its flat side faces disposed horizontally by twisting the bar, as shown at 15. The intermediate portion of each member is provided with a bulged yoke portion 16, and the prod is separated from this yoke portion by a shank, as 17, arranged in line with the stop-arm 11. Bolt-receiving openings 18 are formed in the members at the opposite ends of the yoke portions, bolts, as 19, being passed therethrough.

As already described, the two members are exact duplicates, and in use they are arranged in reversed relation, so that the stop-arm 11 of one will rest flat against the shank 17 of the other and the openings will be in alinement. The bolts 19 are then passed through these openings, thereby securing the members together and providing an upwardly and a downwardly extending stop-arm, as well as upper and lower rearwardly-extending prods. The simplicity of this structure will be obvious, as will also the fact that it can be manufactured at small cost, because both members are the same in form. Furthermore, there are no small prods or other parts separate from the members and liable to be lost should the coupling-bolts from any cause become broken.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In an animal-poke, a pair of members comprising flat-sided metallic bars, each having a stop-arm at one end, a rearwardly-extending prod at the other end, and an intermediate bulged yoke portion located between the arm and prod, the ends of the yoke portions of the members resting against each other, and bolts passing through said ends to secure the members together.

2. In an animal-poke, a pair of duplicate members comprising flat-sided metallic bars, each having a stop-arm at one end that is provided with a forwardly-projecting terminal hook, a rearwardly-extending prod at the other end, and an intermediate bulged yoke portion located between the arm and prod, the members being arranged in reversed relation and the reversed ends of the yoke portions being secured together.

In testimony that I claim the foregoing as my own I have hereto affixed my signature in the presence of two witnesses.

WILLIAM R. EVANS.

Witnesses:
HARVEY J. YOUNG,
B. G. AGEE.